United States Patent
Dooley et al.

(10) Patent No.: US 10,276,040 B2
(45) Date of Patent: Apr. 30, 2019

(54) METHOD FOR TRACKING A TARGET VEHICLE APPROACHING A MOTOR VEHICLE BY MEANS OF A CAMERA SYSTEM OF THE MOTOR VEHICLE, CAMERA SYSTEM AND MOTOR VEHICLE

(71) Applicant: Connaught Electronics Ltd., Tuam, County Galway (IE)

(72) Inventors: Damien Dooley, Claremorris (IE); Martin Glavin, Turloughmore (IE); Edward Jones, Salthill (IE); Liam Kilmartin, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 93 days.

(21) Appl. No.: 15/322,225

(22) PCT Filed: Apr. 29, 2015

(86) PCT No.: PCT/EP2015/059405
§ 371 (c)(1),
(2) Date: Dec. 27, 2016

(87) PCT Pub. No.: WO2015/197237
PCT Pub. Date: Dec. 30, 2015

(65) Prior Publication Data
US 2017/0162042 A1   Jun. 8, 2017

(30) Foreign Application Priority Data

Jun. 27, 2014   (DE) .................. 10 2014 109 062

(51) Int. Cl.
*B60Q 9/00* (2006.01)
*G01S 5/16* (2006.01)
(Continued)

(52) U.S. Cl.
CPC .......... *G08G 1/04* (2013.01); *B60K 31/0008* (2013.01); *B60Q 9/008* (2013.01); *G01S 3/786* (2013.01);
(Continued)

(58) Field of Classification Search
CPC .......... G08G 1/04; G08G 1/166; G08G 1/167; G06T 7/248; A06K 9/00798;
(Continued)

(56) References Cited

U.S. PATENT DOCUMENTS 5,638,116 A   6/1997  Shimoura et al.
6,424,272 B1  7/2002  Gutta et al.
(Continued)

OTHER PUBLICATIONS

International Search Report issued in corresponding application No. PCT/EP2015/059405 dated Aug. 6, 2015 (3 pages).
(Continued)

*Primary Examiner* — Kim Y Vu
*Assistant Examiner* — Molly Delaney
(74) *Attorney, Agent, or Firm* — Osha Liang LLP

(57) ABSTRACT

The invention relates to a method for tracking a target vehicle (9) approaching a motor vehicle (1) by means of a camera system (2) of the motor vehicle (1). A temporal sequence of images (10) of an environmental region of the motor vehicle (1) is provided by means of at least one camera (3) of the camera system (2). The target vehicle (9) is detected in an image (10) of the sequence by means of an image processing device (5) of the camera system (5) based on a feature of a front (11) or of a rear of the target vehicle (9) and then the target vehicle (9) is tracked over subsequent images (10) of the sequence based on the detected feature. Wherein at least a predetermined feature of a lateral flank (14) of the target vehicle (9) is detected in one of the subsequent images (10) of the sequence by the image
(Continued)

Figure 1:
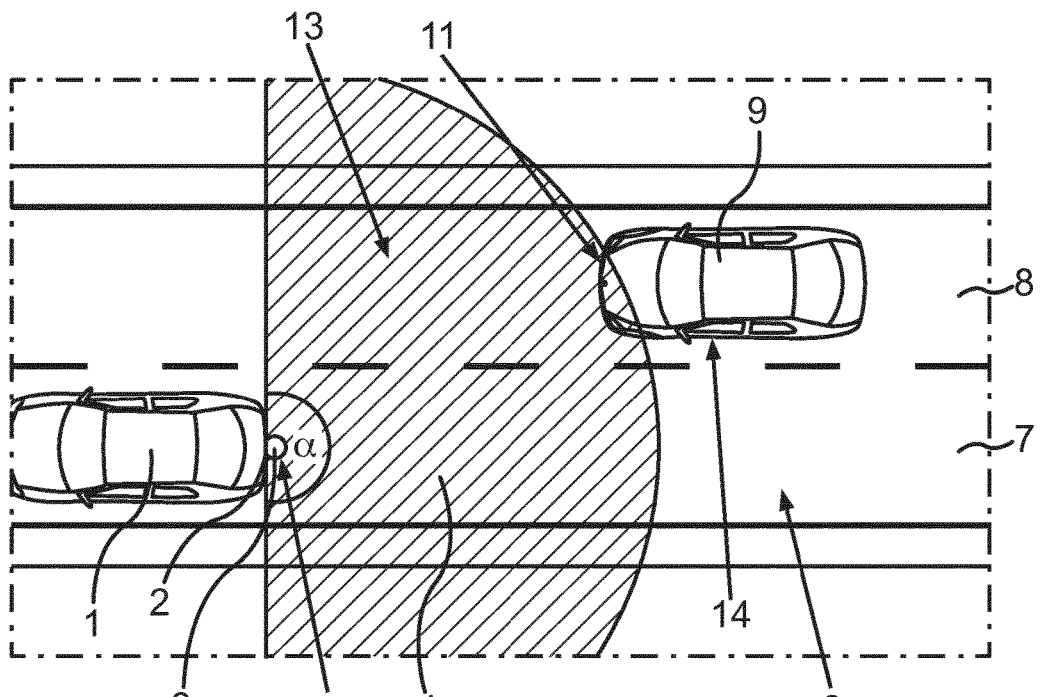

processing device (5), and after detection of the feature of the lateral flank (14), the target vehicle (9) is tracked over further images (10) of the sequence based on the feature of the lateral flank (14).

15 Claims, 5 Drawing Sheets

(51) Int. Cl.
| | |
|---|---|
| *G06K 9/00* | (2006.01) |
| *G06K 9/46* | (2006.01) |
| *G08G 1/04* | (2006.01) |
| *G08G 1/16* | (2006.01) |
| *B60K 31/00* | (2006.01) |
| *G01S 11/12* | (2006.01) |
| *G01S 3/786* | (2006.01) |
| *G06T 7/246* | (2017.01) |

(52) U.S. Cl.
CPC ............... *G01S 5/16* (2013.01); *G01S 11/12* (2013.01); *G06K 9/00798* (2013.01); *G06K 9/00805* (2013.01); *G06K 9/4633* (2013.01); *G06T 7/248* (2017.01); *G08G 1/16* (2013.01); *G08G 1/166* (2013.01); *G08G 1/167* (2013.01); *B60K 2031/0016* (2013.01); *B60R 2300/108* (2013.01); *B60R 2300/307* (2013.01); *B60R 2300/8066* (2013.01); *B60R 2300/8093* (2013.01); *G06T 2207/30261* (2013.01)

(58) Field of Classification Search
CPC .... A06K 9/00805; A06K 9/4633; G01S 5/16; G01S 11/12
See application file for complete search history.

(56) References Cited

U.S. PATENT DOCUMENTS

| | | | |
|---|---|---|---|
| 8,004,425 B2 | 8/2011 | Hoek et al. | |
| 2003/0085806 A1 | 5/2003 | Samman et al. | |
| 2007/0263901 A1* | 11/2007 | Wu .................... | G06K 9/00805 382/104 |
| 2013/0063600 A1* | 3/2013 | Pawlicki ............ | B60K 31/0008 348/148 |
| 2014/0160289 A1* | 6/2014 | Lee .................... | G06K 9/00805 348/148 |

OTHER PUBLICATIONS

Written Opinion of the International Searching Authority issued in corresponding application No. PCT/EP2015/059405 dated Aug. 6, 2015 (7 pages).

German Search Report issued in corresponding application No. DE10 2014 109 062.4 dated Apr. 8, 2015 (7 pages).

Kwak Kiho et al, "Online Approximate Model Representation of Unknown Objects"; IEEE International Conference of Robotics and Automation (ICRA); pp. 1725-1732; XP032650477; May 31, 2014 (8 pages).

* cited by examiner

METHOD FOR TRACKING A TARGET VEHICLE APPROACHING A MOTOR VEHICLE BY MEANS OF A CAMERA SYSTEM OF THE MOTOR VEHICLE, CAMERA SYSTEM AND MOTOR VEHICLE

The invention relates to a method for tracking a target vehicle approaching a motor vehicle by means of a camera system of the motor vehicle. A temporal sequence of images of an environmental region of the motor vehicle is provided by means of at least one camera of the camera system. The target vehicle is detected in an image of the sequence by means of an image processing device of the camera system based on a feature of a front or a rear of the target vehicle, and then the target vehicle is tracked over subsequent images of the sequence based on the detected feature. In addition, the invention relates to a camera system for a motor vehicle, which is formed for performing such a method, as well as to a motor vehicle with such a camera system.

Camera systems for detecting and tracking a target vehicle approaching a motor vehicle are known from the prior art. Thus, a camera system of the motor vehicle with a camera and an image processing device is for example used, wherein the target vehicle is detected in a sequence of images captured by the camera by means of the image processing device and thus tracked over the sequence of the images. The method is based on tracking by detection of features of a front or a rear of the target vehicle and uses a detector, which is for example trained with an AdaBoost algorithm.

Furthermore, from the printed matter U.S. Pat. No. 8,004,425 B2, a system is known, in which cameras are mounted on the front and rear on the vehicle in order to detect the target vehicle in a blind spot area of the motor vehicle. The detection of the target vehicle is effected with the aid of an optical flow. The optical flow detects altered pixels over the sequence of the images.

A further system is known from the printed matter U.S. Pat. No. 6,424,272 B1. In this case, the cameras are attached to the side of the motor vehicle and an object recognition method is applied to detect the target vehicle in the blind spot area. A system for detecting a target vehicle in the blind spot area is also known from the printed matter US 2003/0085806 A1. This system uses two stereo cameras to calculate a stereo view of the blind spot area and to detect therein a risk or the target vehicle by means of the optical flow.

It is disadvantageous in the mentioned prior art that often multiple cameras are required to monitor the blind spot area with respect to the target vehicle. This results in increased production and service cost. Furthermore, thus, a system monitoring the blind spot area cannot be retrofitted without much effort. A further disadvantage is the use of the optical flow, which provides information about a variation in the sequence of the images, but can only inaccurately classify a certain object. In addition, during travel of the motor vehicle, the background in the images also moves, which has to be removed from the images—for example based on sensor data of other sensors. Here, the method detecting features of the front or the rear of the target vehicle with the detector of the AdaBoost algorithm provides a remedy. However, this method also exhibits a deficiency if the target vehicle approaches the camera and the front or the rear of the target vehicle is thereby depicted in another viewing angle. Thus, the current images of the target vehicle differ from the training images, which are underlying the AdaBoost algorithm and by which the detector has been trained. A further approach of the target vehicle therefore results in a decreasing confidence value of the detector, which represents a measure of the reliability of the detection. In case of a too great difference between the current images and the training images, the detection is no longer possible. This all results in the target vehicle only being able to be tracked over a limited period of time and being lost very fast by the image processing device, in particular if the target vehicle enters the blind spot area of the motor vehicle in overtaking.

It is the object of the invention to provide a method, a camera system as well as a motor vehicle, in which measures are taken, which ensure that the target vehicle can be tracked particularly reliably and in particular over a longer period of time, preferably also in the blind spot area of the motor vehicle, even with a variation of the viewing angle caused by the approach.

According to the invention, this object is solved by a method, by a camera system as well as by a motor vehicle having the features according to the respective independent claims. Advantageous implementations of the invention are the subject matter of the dependent claims, of the description and of the figures.

A method according to the invention serves for tracking a target vehicle approaching a motor vehicle, in particular passing the motor vehicle, by means of a camera system of the motor vehicle. The tracking is preferably effected during an overtaking maneuver of the motor vehicle or while the motor vehicle itself is overtaken by the target vehicle. Preferably, the target vehicle is also tracked in the blind spot area of the motor vehicle. A temporal sequence of images of an environmental region of the motor vehicle is provided by means of at least one camera of the camera system. The target vehicle is detected in an image of the sequence by means of an electronic image processing device (e.g. DSP) of the camera system based on a feature of a front or a rear of the target vehicle, and then the target vehicle is tracked over subsequent images of the sequence based on the detected feature. According to the invention, it is provided that at least a predetermined feature of a lateral flank of the target vehicle is detected by the image processing device in one of the subsequent images of the sequence—and thus during tracking the target vehicle based on the feature of the front or the rear. After detection of the feature of the lateral flank, the target vehicle is then tracked over further images of the sequence based on the feature of the lateral flank such that it is virtually transitioned from tracking the target vehicle based on the front or the rear to tracking the target vehicle based on the feature of the lateral flank as soon as the feature of the lateral flank can be reliably detected by the image processing device.

By the method according to the invention, it becomes possible to further track the target vehicle approaching the motor vehicle although the viewing angle constantly changes. In other words, the tracked feature of the front or the rear is replaced with or supported by the new tracked feature of the lateral flank. This has the advantage that the target vehicle overall can be tracked over a relatively long period of time, thus in particular even if the target vehicle passes the motor vehicle and exclusively the lateral flank of the target vehicle is depicted in the images of the camera.

Preferably, the camera is a front camera, which is in particular disposed behind a windshield of the motor vehicle, for example directly on the windshield in the interior of the motor vehicle. The front camera then captures the environment in direction of travel or in vehicle longitudinal direction in front of the motor vehicle. However, a rear view camera can also be employed as the camera, which captures the environment in direction of travel or in vehicle longitudinal direction behind the motor vehicle. Generally, it can be provided that a camera axis extending perpendicularly to the plane of the image sensor is oriented parallel to the vehicle longitudinal axis.

Preferably, the camera is a video camera, which is able to provide a plurality of images (frames) per second. The camera can be a CCD camera or a CMOS camera.

In an embodiment, it is provided that a wheel arch (i.e. wheel case) of the target vehicle is detected as the feature of the lateral flank. This is advantageous because the wheel arch is a reliable and distinctive feature, which is present in many target vehicles. In addition, the wheel arch is a feature having a very similar shape in many target vehicles. The reason for this is that the wheel arch always surrounds round wheels and therefore itself has a certain radius. Moreover, the wheel arch is already very early clearly recognizable, thus with a target vehicle far away and/or steep viewing angle, namely considerably earlier than the wheels of the target vehicle themselves.

Additionally or alternatively, a wheel of the target vehicle can be detected as a feature of the lateral flank. The wheel is a very robust feature because it is always present on target vehicles and thus allows reliable detection of it. Other objects, which may be accidentally considered as the target vehicle, rarely have circular components or features such that the risk of confusion is reduced.

In particular, it is provided that the feature of the lateral flank is described with a Hough transform, in particular a Hough circle transform. The Hough transform has the advantage that a circular object can be represented thereby in a parameter space. By the parameter space, increased robustness on the one hand and higher generality on the other hand result because the wheel can be abstractly represented for example as a circle.

In a further development, it is provided that a first confidence value is determined by the image processing device, which indicates the reliability of the detection of the feature of the front or the rear of the target vehicle in tracking the target vehicle. The detection of the feature of the lateral flank can only be effected if the first confidence value falls below a preset first threshold value. It is advantageous that unnecessary computational effort is avoided in calculating the feature of the lateral flank and the feature of the lateral flank is only searched if tracking the target vehicle based on the front or the rear can no longer be reliably ensured. In addition, by the calculation of the first confidence value, it can be very well monitored from when the risk increases that the tracking of the target vehicle based on the front or the rear ceases.

It is further provided that a first confidence value is determined by the image processing device, which indicates the reliability of the detection of the feature of the front or of the rear of the target vehicle, and a second confidence value is determined by the image processing device, which indicates the reliability of the detection of the feature of the lateral flank, and the tracking of the target vehicle by at least the feature of the front or of the rear of the target vehicle is effected if a preset second threshold value falls below a second confidence value, and the tracking of the target vehicle by at least the feature of the lateral flank of the target vehicle is effected if a preset first threshold value falls below a first confidence value. The advantage is that thus in each case the most reliable feature and/or the feature with the highest confidence value can be selected. It is also possible that a plurality of features are used, which are then weighted by the respective confidence value.

Preferably, the target vehicle is tracked by the feature of the lateral flank if a predetermined distance between the motor vehicle and the target vehicle falls below a preset threshold value. This is advantageous because the distance can be for example, in addition or alternatively be determined by means of another sensor of the motor vehicle. This can lead to a higher reliability of the determined distance and/or to increased safety due to redundant determining of the distance. For example, a specific location on the target vehicle can be selected as reference point of the target vehicle's position relative to the motor vehicle. This can happen regardless of whether the detected feature is a feature of the front or a feature of the rear or a feature of the lateral flank. This point can be determined for example by means of a predetermined "offset" from the center of the motor vehicle or the center of the rear axle of the motor vehicle.

In a particular development, it is provided that a front wheel arch or a rear wheel arch and/or a front wheel or a rear wheel are detected as the feature of the lateral flank depending on a relative position of the target vehicle with respect to the motor vehicle in vehicle longitudinal direction. For example, if the target vehicle is tracked based on the front, thus, first—if the target vehicle is still relatively far away from the motor vehicle—the front wheel arch and/or the front wheel can be detected as the feature because this feature is then closer to the camera and thus allows more reliable detection. Analogously, this applies to the rear wheel arch and/or the rear wheel if the target vehicle faces the motor vehicle with its rear. If the target vehicle is then closer to the motor vehicle, it can be correspondingly changed from the front (or rear) feature to the rear (or front) feature. A change of the features can also occur if the one part of the target vehicle is in a region of the camera, which results in severe distortions due to a special lens of the camera.

Preferably, the feature of the lateral flank is generalized by means of a generalization algorithm. This means that the feature is presented in simplified or generalized manner and only a feature part containing the main information for identifying the feature is used for detecting the feature. The generalization algorithm results in the feature describing a plurality of differently shaped wheel arches or wheels. Thus, target vehicles of different construction or production series can also be detected. Moreover, the detection proceeds faster because a generalized feature has a lower data extent. In particular, a Douglas-Peucker algorithm is used as the generalization algorithm. The Douglas-Peucker algorithm is an algorithm for curve processing, which has the goal to simplify a traverse line given by a sequence of points by omitting individual points such that the coarse shape is preserved. The present traverse line is an edge of the wheel arch from a gradient image of the image. The Douglas-Peucker algorithm offers a simple and fast possibility of generalizing the feature.

Furthermore, it is preferably provided that the detection of the front or of the rear includes that a bounding box is determined by the image processing device, in which the front or the rear is depicted, and exclusively a region of interest is taken as a basis for detecting the feature of the lateral flank, which is determined depending on the bounding box. After the detection of the approaching target vehicle first occurs with the feature of the front or the rear, a certain area of the image is already preselected by a bounding box. This bounding box is now used to determine a region of interest for the detection of the feature of the lateral flank. Thus, the entire image does no longer have to be searched for the feature of the lateral flank and computing power and computing time are saved. In addition, the error probability of detection decreases.

In a configuration, it is provided that at least in a transition from tracking based on the front or the rear to tracking based on the lateral flank, the tracking of the target vehicle is supported by means of a prediction algorithm, in particular a Kalman filter. A prediction algorithm tries to extrapolate the next position of the target vehicle in the image. A Kalman filter offers a very fast and little computationally intensive method to this. In more complex situations, for example curves with several target vehicles, a condensation algorithm can also be used, which is deemed more computationally intensive, but in return more robust. The advantage of a prediction algorithm is that fast initialization of the tracking with the new features is possible upon change of the features.

It is also provided that the sequence of the images is provided by means of a camera, the field of view of which has an opening angle greater than 150°, in particular greater than 160°, still more preferred greater than 180°. The advantage is that a single camera disposed on the vehicle rear or on the vehicle front is thus sufficient to monitor the blind spot areas to the left and right besides the motor vehicle. Thereby, the possibility arises to retrofit the method for an already existing camera system without much effort.

In a further mode of configuration, in detecting the feature of the lateral flank, a geometric shape of this feature is taken into account depending on calibration data of an external orientation of the camera and/or a position of the camera and/or distortion parameters of the camera. The external orientation describes the posture and position of the camera during the image capture related to the object of capture itself—here the target vehicle. By the calibration data, a certain shape of the feature can be anticipated for each position in the image. For example, the contours of the wheels of the target vehicle vary according to in which position the target vehicle is relative to the camera. Thus, for example the contours of the wheels in the image are rather of elliptical shape if the target vehicle is farther away from the motor vehicle. The circular shape is only recognizable if the target vehicle is close to the motor vehicle, for instance in its blind spot area. The situation is analogous with the wheel arches.

In an embodiment, the target vehicle is tracked in a blind spot area of the motor vehicle. The blind spot area of the motor vehicle is the area, which cannot or can only hardly be seen by a driver of the motor vehicle with side-view and/or rear-view mirrors. This can become dangerous if the driver intends a lane change or a turning operation, but cannot access with certainty if the blind spot area next to the motor vehicle is free. By the present method, a risk or another traffic participant or the target vehicle can be detected in this blind spot area and optionally a warning can be output to the driver. The warning can for example be acoustically and/or visually and/or haptically effected.

A camera system according to the invention for a motor vehicle includes at least a camera for providing a sequence of images of an environmental region of the motor vehicle and an image processing device adapted to perform a method according to the invention.

A motor vehicle according to the invention, in particular a passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
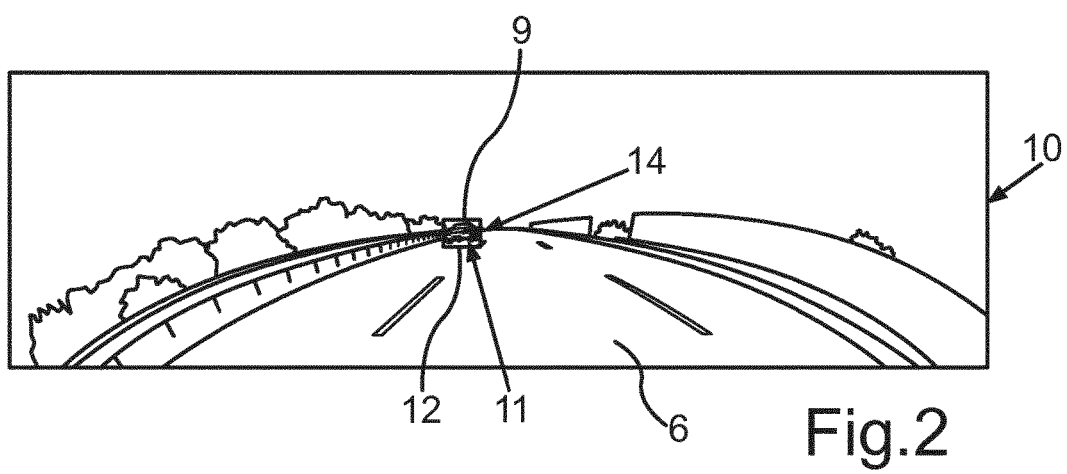
Figure 3:
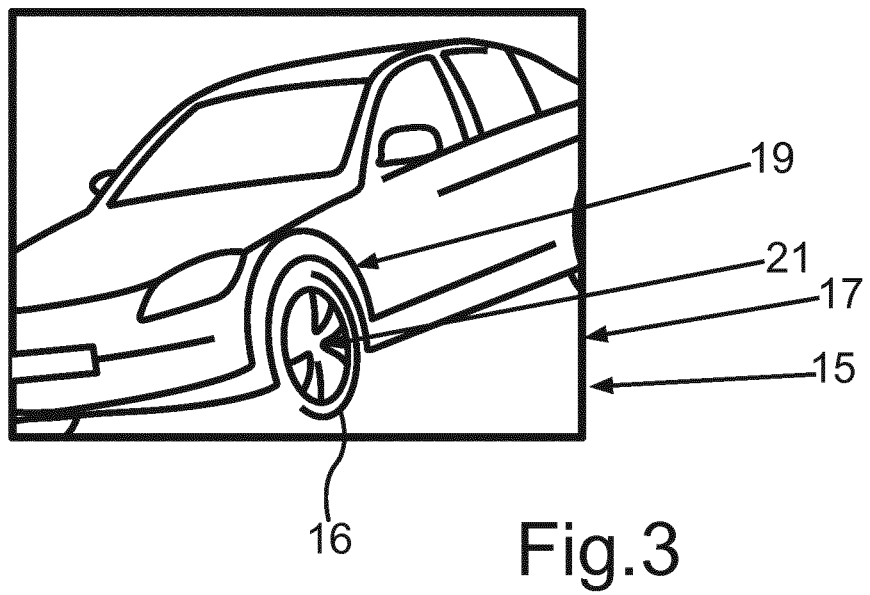
Figure 4:
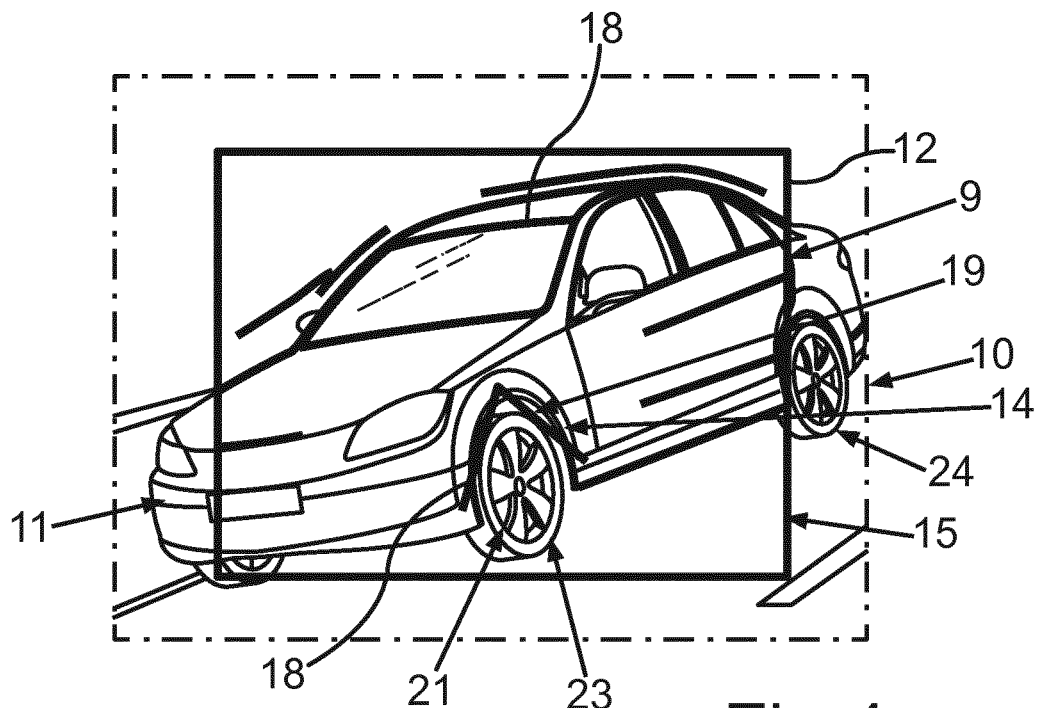
Figure 5:
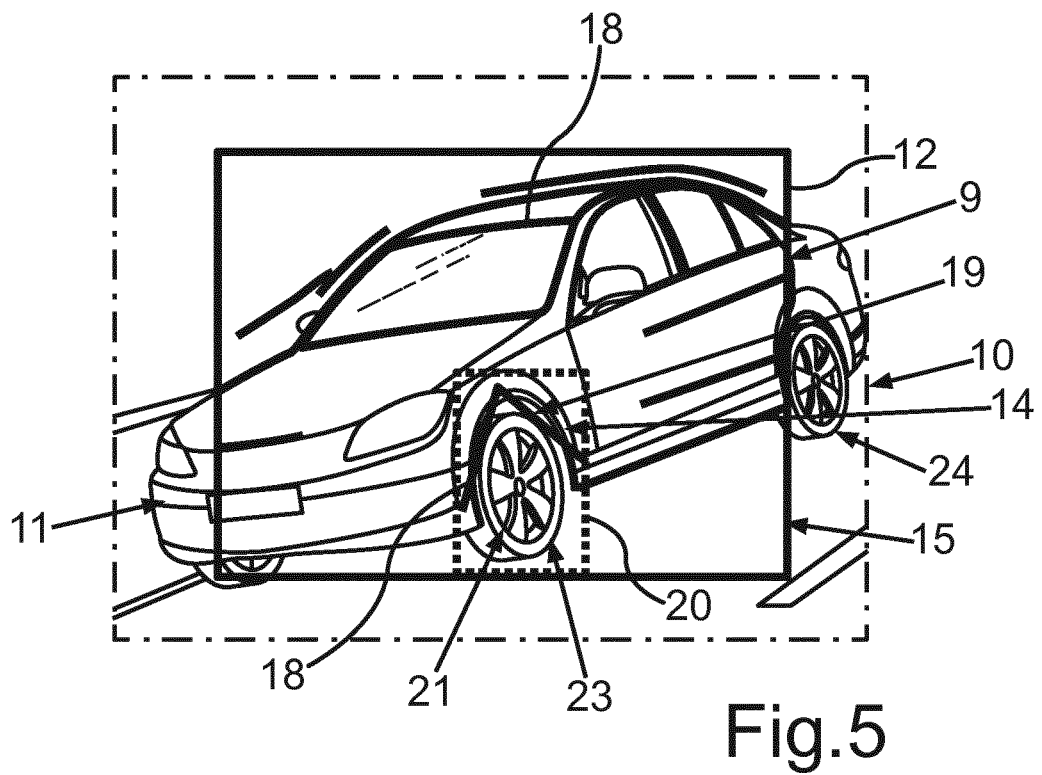
Figure 6:
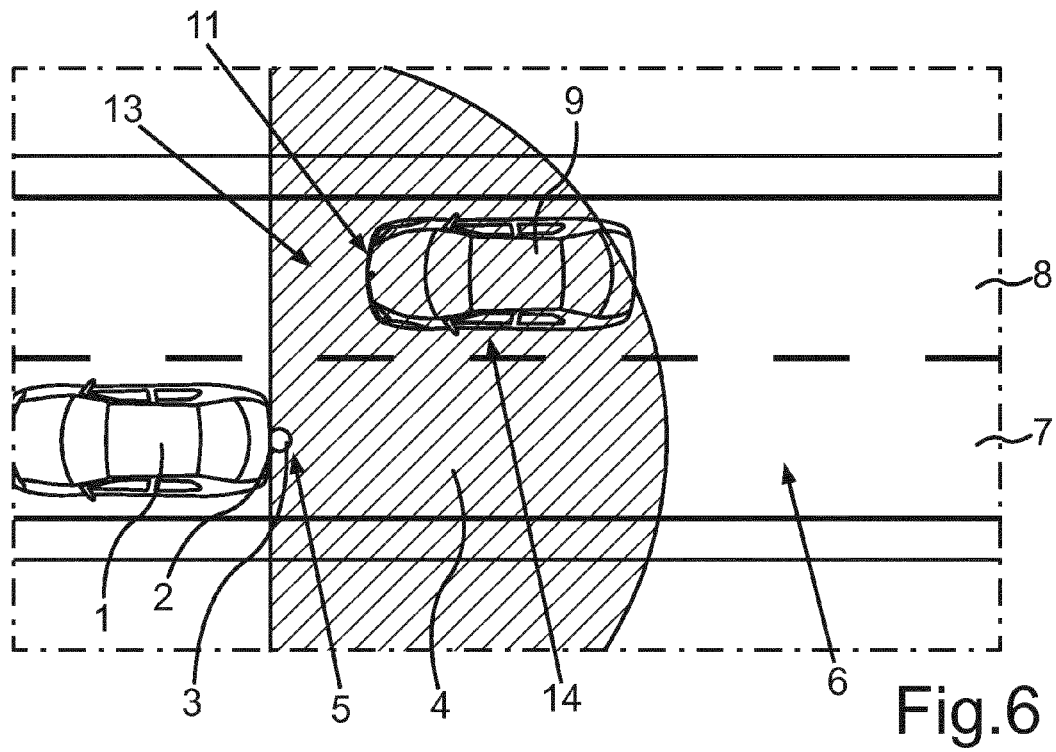
Figure 7:
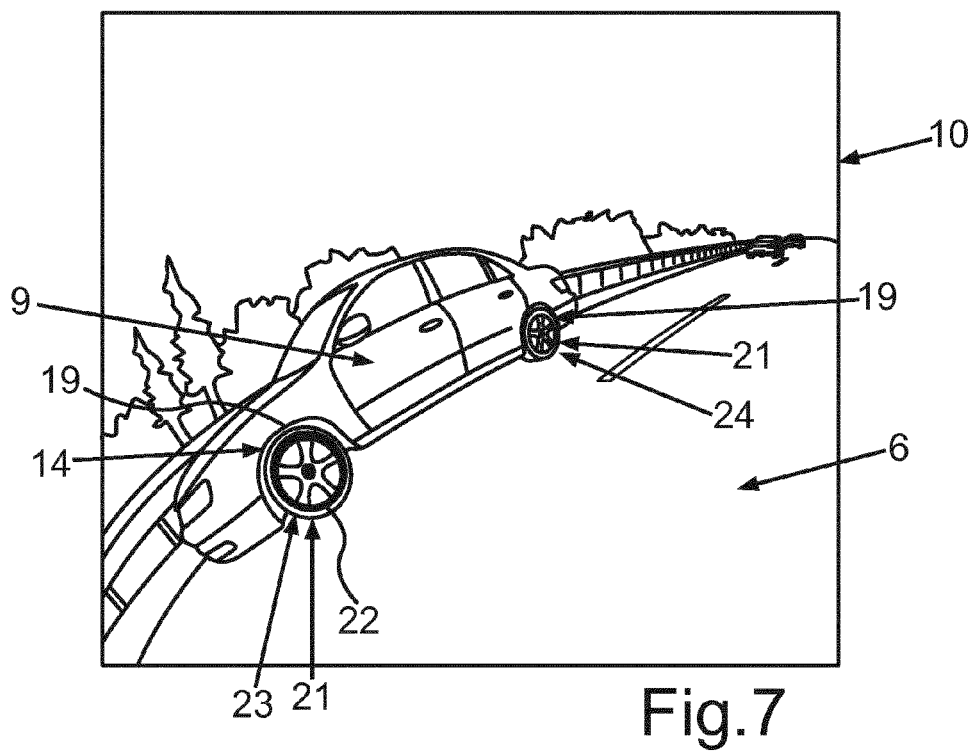
Figure 8:
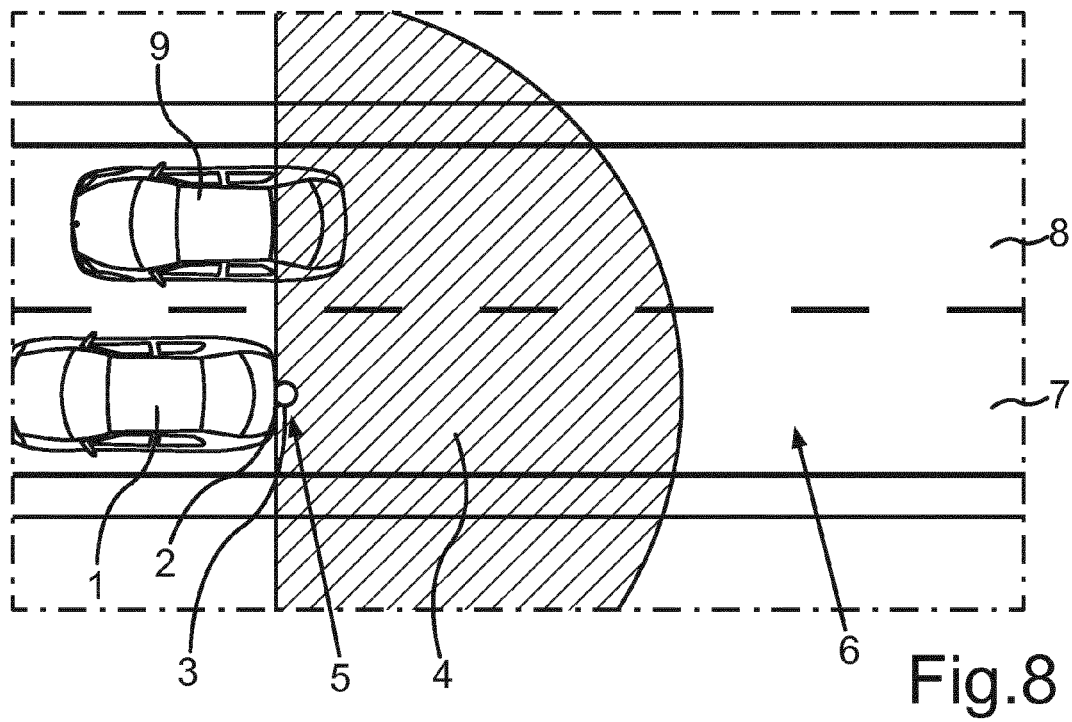
Figure 9:
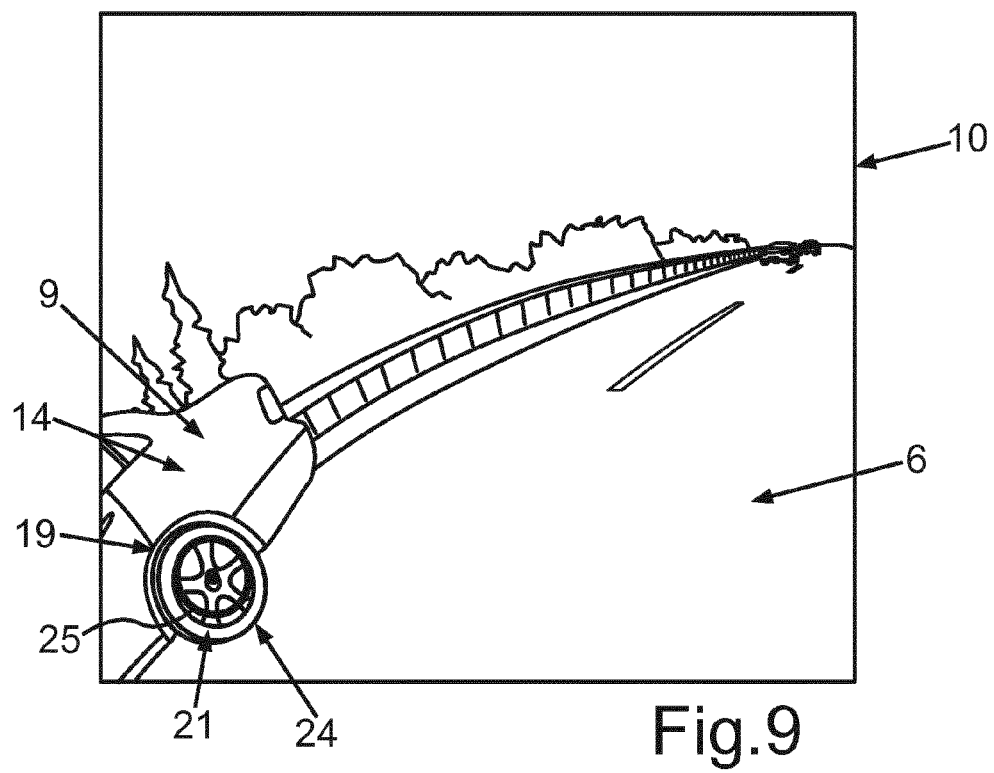

There show:

FIG. 1 in schematic plan view a target vehicle approaching a motor vehicle with a camera system from behind;

FIG. 2 in schematic illustration an image of the target vehicle, wherein the image is provided by means of a camera of the camera system attached to the rear of the motor vehicle and the front of the target vehicle is detected in the image;

FIG. 3 in schematic illustration a gradient image with edges of the target vehicle;

FIG. 4 in schematic illustration a further image of the target vehicle, wherein a region of interest is determined and generalized edges are indicated by line segments;

FIG. 5 in schematic illustration the image according to FIG. 4, wherein a feature of a lateral flank of the target vehicle, in particular a wheel arch and/or a wheel, is detected;

FIG. 6 in schematic plan view an illustration analogous to FIG. 1, wherein the target vehicle has approached to the point that the feature of the lateral flank is tracked;

FIG. 7 in schematic illustration yet a further image, in which the target vehicle is depicted in the position according to FIG. 6;

FIG. 8 in schematic plan view an illustration analogous to FIG. 1, wherein the target vehicle has approached to the point that a rear feature of the lateral flank is detected; and FIG. 9 in schematic illustration yet a further image, in which the target vehicle is depicted in the position according to FIG. 8.

In FIG. 1, a plan view of a motor vehicle 1 with a camera system 2 according to an embodiment of the invention is schematically illustrated. The camera system 2 includes a camera 3 with a field of view 4 and an image processing device 5, which can for example be integrated in the camera 3. However, this image processing device 5 can also be a component separate from the camera 3, which can be disposed in any position in the motor vehicle 1. In the embodiment, the camera 3 is disposed on the rear of the motor vehicle 1 and captures an environmental region behind the motor vehicle 1. However, an application with a front camera is also possible.

The field of view 4 angularly extends over 180° behind the motor vehicle 1, in particular symmetrically with respect to the center longitudinal axis of the motor vehicle 1. The motor vehicle 1 is on a left lane 7 of a two-lane road 6, while another vehicle—a target vehicle 9—is on a right lane 8. The target vehicle 9 approaches the motor vehicle 1 from behind and presumably will overtake it.

The camera 3 has a horizontal capturing angle $\alpha$, which can for example be in a range of values from 120° to 200°, and a vertical capturing angle (not illustrated), which for example extends from the surface of the road 6 directly behind the motor vehicle 1 up to the horizon and beyond. These characteristics are for example allowed with a fish-eye lens.

The camera 3 can be a CMOS camera or else a CCD camera or any image capturing device, by which target vehicles 9 can be detected.

In the embodiment according to FIG. 1, the camera 3 is disposed in a rear region of the motor vehicle 1 and captures an environmental region behind the motor vehicle 1. However, the invention is not restricted to such an arrangement of the camera 3. The arrangement of the camera 3 can be different according to embodiment. For example, the camera 3 can also be disposed in a front region of the motor vehicle 1 and capture the environmental region in front of the motor vehicle 1. Several such cameras 3 can also be employed, which each are formed for detecting an object or target vehicle 9.

The situation as it is illustrated in FIG. 1 and FIG. 2, can analogously also occur if the field of view 4 of the camera 3 is directed forwards in direction of travel or a front camera is employed. For example, this is the case if the motor vehicle 1 overtakes the target vehicle 9.

The camera 3 is a video camera continuously capturing a sequence of images. The image processing device 5 then processes the sequence of images in real time and can recognize and track the target vehicle 9 based on this sequence of images. This means that the image processing device 5 can determine the respectively current position and movement of the target vehicle 9 relative to the motor vehicle 1.

The camera system 2 is a blind spot warning system, which monitors a blind spot area 13 and is able to warn the driver of the motor vehicle 1 of a detected risk of collision with the target vehicle 9 with output of a corresponding warning signal. The blind spot area is an environmental region of the motor vehicle 1, which cannot or can only hardly be seen by a driver of the motor vehicle with the aid of side-view and/or rear-view mirrors. According to a definition of the blind spot area, it extends from the rear of the motor vehicle 1 by more than two vehicle lengths rearwards on adjacent lanes.

FIG. 2 shows an exemplary image 10, which is provided by the camera 3 in the situation according to FIG. 1. The target vehicle 9 is detected in the image 10 based on a feature of a front 11 of the target vehicle 9 by means of the image processing device 5. This detection is identified with a rectangular frame or a bounding box 12 in FIG. 2. This bounding box 12 is output by the detection algorithm, which is executed by the image processing device 5 for detecting the target vehicle 9.

The detection of the target vehicle 9 is first performed based on features of the front 11 of the target vehicle 9. However, the view of the target vehicle 9 changes, while the target vehicle 9 approaches the motor vehicle 1. This is a challenge for a detector used for this, which has been trained with features of the front 11 in front view. As a result, a confidence value decreases, which is a measure of quality of the reliability of the detection. This is recognizable in FIG. 3 based on a gradient image 17, which shows edges 16 of the target vehicle 9. As is apparent from FIG. 3, the viewing angle changes with time such that a further detection of the target vehicle 9 based on the features of the front 11 cannot be reliably ensured anymore.

In order to be able to further ensure the reliable tracking of the target vehicle 9, in a next step, a feature of the lateral flank 14 of the target vehicle 9 is extracted. However, this feature preferably is not searched in the entire image 10, but only in a region of interest 15, as it is illustrated in the image 10 according to FIG. 4, and which is determined depending on the bounding box 12, which is provided by the detection of the front 11. Thus, the bounding box 12 depends on the detection based on the feature of the front 11 and allows faster initialization of the tracking of the feature of the lateral flank 14.

In the next step, the gradient image 17 is calculated from the region of interest 15, as it is shown in FIG. 3. For calculating the gradient image 17, the region of interest 15 of the image 10 is converted to a grey-scale image, smoothed with a Gaussian filter and for example processed with a Canny edge detector.

The extraction of the feature of the lateral flank 14 is effected based on edges 16 of the gradient image 17. As a first feature of the lateral flank 14, a (here front) wheel arch 19 is chosen. The edges 16 of the wheel arch 19 are generalized with a generalization algorithm, in particular with a Douglas-Peucker algorithm. Generalized edges 18 result, as it is illustrated in FIG. 4. The generalization algorithm effects a reduction of the data volume, this results in increase of the computing speed and facilitates the detection of the wheel arch 19 because now wheel arches 19 of various models are covered and thus can be better compared.

The detection of the (generalized) wheel arch 19 is identified with a rectangle 20 in FIG. 5.

If the target vehicle 9 has now approached the motor vehicle 1 to the point as it is illustrated in FIG. 6, in a further step—after tracking the wheel arch 19—it is switched to tracking a wheel 21 of the target vehicle 9. The detection of the wheel 21 is effected with a description by a Hough transform, in particular a Hough circle transform. The Hough circle transform approximates a circle, which is generated by the edges 16, which arise due to the intensity difference between rim and tire or tire and background. An exemplary circle 22 in the image 10 shown in FIG. 7 exemplifies the result of the Hough circle transform.

In tracking the lateral flank 14, temporarily, both features are tracked—the wheel arch 19 and the wheel 21—until the target vehicle 9 is any time as close as it can be switched to exclusively tracking the wheel 21—namely a front wheel 23 and/or a rear wheel 24. The shorter the distance between the target vehicle 9 and the motor vehicle 1 is, the clearer is the circular shape of the wheel 21 in the image 10. The requirement for the Hough transform is a predefined geometric shape, presently a circle. However, basically, other shapes such as for example ellipses are also conceivable.

A change of the tracking of the front wheel 23 to the tracking of the rear wheel 24 is automatically effected if the target vehicle 9 is located next to the motor vehicle 1—as shown in FIG. 8—and the front wheel 23 is no longer in the field of view 4 of the camera 3. The description of the rear wheel 24 by the Hough circle transform is shown with a circle 25 in FIG. 9.

The respective change of the features is effected depending on a prediction algorithm, in particular a Kalman filter. Hereby, the tracking of the new feature can be faster initialized and/or more precisely verified. A change between the features occurs first from features of the front 11 to features of the lateral flank 14 (first in particular to the wheel arch 19) and subsequently then from the wheel arch 19 to the wheel 21, in particular first to the front wheel 23 and then to the rear wheel 24. In a transitional region, it is provided to track the respective old and new features at the same time and to change the features depending on the respective confidence value.

In case the target vehicle 9 travels past the motor vehicle 1 even more than in FIG. 8, it is provided to continue the tracking with a camera attached to the lateral flank of the motor vehicle 1 and/or to fall back on the above mentioned front camera.

The change of the features can also be effected in reverse order than described based on the figures. This is the case if the motor vehicle 1 overtakes the target vehicle 9. Then, the first tracked feature is the rear of the target vehicle 9. Next, the rear wheel arch 19 is incorporated and tracked as the feature of the lateral flank 14. Subsequently, it is changed from the rear wheel arch 19 to the rear wheel 24 and then to the front wheel 23.

Moreover, a preset threshold value for a relative distance between the motor vehicle 1 and the target vehicle 9 as further means for effecting a later feature detection so that if the distance of the approaching target vehicle 9 falls below the preset threshold value, the detection and/or tracking of the feature of the lateral flank 14 commences.

Furthermore, the searched shape of the features is dependent on the position of the target vehicle 9. Due to a calibration of the camera system 2 and the exterior orientation resulting from it, the shape of the features of target vehicles 9 visible in the image 10 can be predicted depending on their current position. Thus, target vehicles 9 farther away have rather elliptical shapes of the wheel arches 19 and of the wheels 21 in the images 10, while closer target vehicles 9 have substantially round shapes of the wheel arches 19 and the wheels 21.

In addition, lens characteristics of the camera system 2 are used to compensate for distortions in the field of view 4. This is for example particularly helpful in case of the used fish-eye lens.

In addition, the detection of the target vehicle 9 is effected depending on the recognition of the lanes 7, 8 with a lane recognition system. It provides information about the course of the road, in particular curves, which is used to calculate the probability that the target vehicle 9 enters the blind spot area 13. Thereby, the risk emanating from the target vehicle 9 can also be inferred.

The lane recognition system is also used in the case of multi-lane roads 6 in order to determine if the target vehicle 9 is in the blind spot area 13 distant by more than an adjacent lane 7, 8 from the motor vehicle 1 in order to thus prevent a false alarm. Otherwise, it is assumed that the motor vehicle 1 collides with the target vehicle 9 upon single lane change.

Lane recognition systems and/or roadway marking recognition systems also allow determining a rate of movement of static objects in the image 10, for example of traffic signs and/or another infrastructure. This is helpful to recognize the erroneous detection of target vehicles 9 and to subsequently remove it.

As an additional expansion, it can be provided that a trajectory or a travel course of the target vehicle 9 is recorded and then extrapolated with a prediction algorithm. The ulterior motive is in that a target vehicle 9 has to move in a certain manner due to its construction, thus, for example, lateral movement is not possible without longitudinal movement. The trajectory is used to render the tracking of the target vehicle 9 more robust and/or more accurate and to temporarily be able to further estimate the position of the target vehicle 9 with poor visibility conditions and/or partial coverings.

It can also be provided that data from a CAN bus, for example speed and/or steering angle of the motor vehicle 1, are used to predict the future direction of travel of the motor vehicle 1 and to estimate when a target vehicle 9 will enter the blind spot area 13.

In a further supplement, the tracking of the target vehicle 9 based on the feature of the lateral flank 14 can be used for organizing an overtaking operation safer. In this case, it is indicted to the driver of the motor vehicle 1 when he has completely passed the target vehicle 9 and can change to the lane in front of the target vehicle 9.

In further embodiments the predetermined feature of the lateral flank 14 in addition or alternatively can also be a wing mirror or another feature of the lateral flank 14.

The invention claimed is:

1. A method for tracking a target vehicle approaching a motor vehicle by a camera system of the motor vehicle, the method comprising:
   providing a temporal sequence of images of an environmental region of the motor vehicle by at least one camera of the camera system;
   detecting the target vehicle in an image of the sequence by an image processing device of the camera system based on a feature of a front or a rear of the target vehicle;
   determining a first confidence value by the image processing device, which indicates the reliability of the detection of the feature of the front or of the rear of the target vehicle in tracking the target vehicle;
   tracking the target vehicle over subsequent images of the sequence based on the detected feature;
   detecting at least a predetermined feature of a lateral flank of the target vehicle in one of the subsequent images of the sequence by the image processing device, wherein the detection of the predetermined feature of the lateral flank is only effected when the first confidence value falls below a preset first threshold value; and
   after detection of the feature of the lateral flank: tracking the target vehicle over further images of the sequence based on the feature of the lateral flank.

2. The method according to claim 1, wherein a wheel arch of the target vehicle is detected as the feature of the lateral flank.

3. The method according to claim 1, wherein a wheel of the target vehicle is detected as the feature of the lateral flank.

4. The method according to claim 1, wherein the feature of the lateral flank is described with a Hough circle transform.

5. The method according to claim 1, further comprising:
   determining a second confidence value by the image processing device, which indicates the reliability of the detection of the feature of the lateral flank,
   wherein the tracking of the target vehicle by at least the feature of the front or of the rear of the target vehicle is effected if a preset second threshold value falls below the second confidence value, and the tracking of the target vehicle by at least the feature of the lateral flank is effected if the preset first threshold value falls below the first confidence value.

6. The method according to claim 1, wherein the target vehicle is tracked by the feature of the lateral flank if a predetermined distance between the motor vehicle and the target vehicle falls below a preset threshold value.

7. The method according to claim 1, wherein depending on a relative position of the target vehicle with respect to the motor vehicle in vehicle longitudinal direction: a front wheel arch or a rear wheel arch and/or a front wheel or a rear wheel are detected as the feature of the lateral flank.

8. The method according to claim 1, wherein the feature of the lateral flank is generalized by a Douglas-Peucker algorithm.

9. The method according to claim 1, wherein the detection of the front or of the rear further comprises determining a that a bounding box by the image processing device, in which the front or the rear is depicted, and exclusively a region of interest is taken as a basis for the detection of the feature of the lateral flank, which is determined depending on the bounding box.

10. The method according to claim 1, wherein at least at a transition from tracking based on the front or the rear to tracking based on the lateral flank, the tracking of the target vehicle is supported by a Kalman filter.

11. The method according to claim 1, wherein the sequence of the images is provided by the at least one camera, the field of view of which has an opening angle greater than 150° in particular greater than 160° still more preferred greater than 180°.

12. The method according to claim 1, wherein in detecting the feature of the lateral flank, a geometric shape of the feature is taken into account depending on the calibration data of an external orientation of the camera and/or a position of the camera and/or distortion parameters of the camera.

13. The method according to claim 1, wherein the target vehicle is tracked in a blind spot area of the motor vehicle.

14. A camera system for a motor vehicle, comprising at least a camera for providing a sequence of images of an environmental region of the motor vehicle; and an image processing device configured to perform a method according to claim 1.

15. A motor vehicle passenger car, comprising a camera system according to claim 14.

* * * * *